United States Patent Office 2,812,118
Patented Nov. 5, 1957

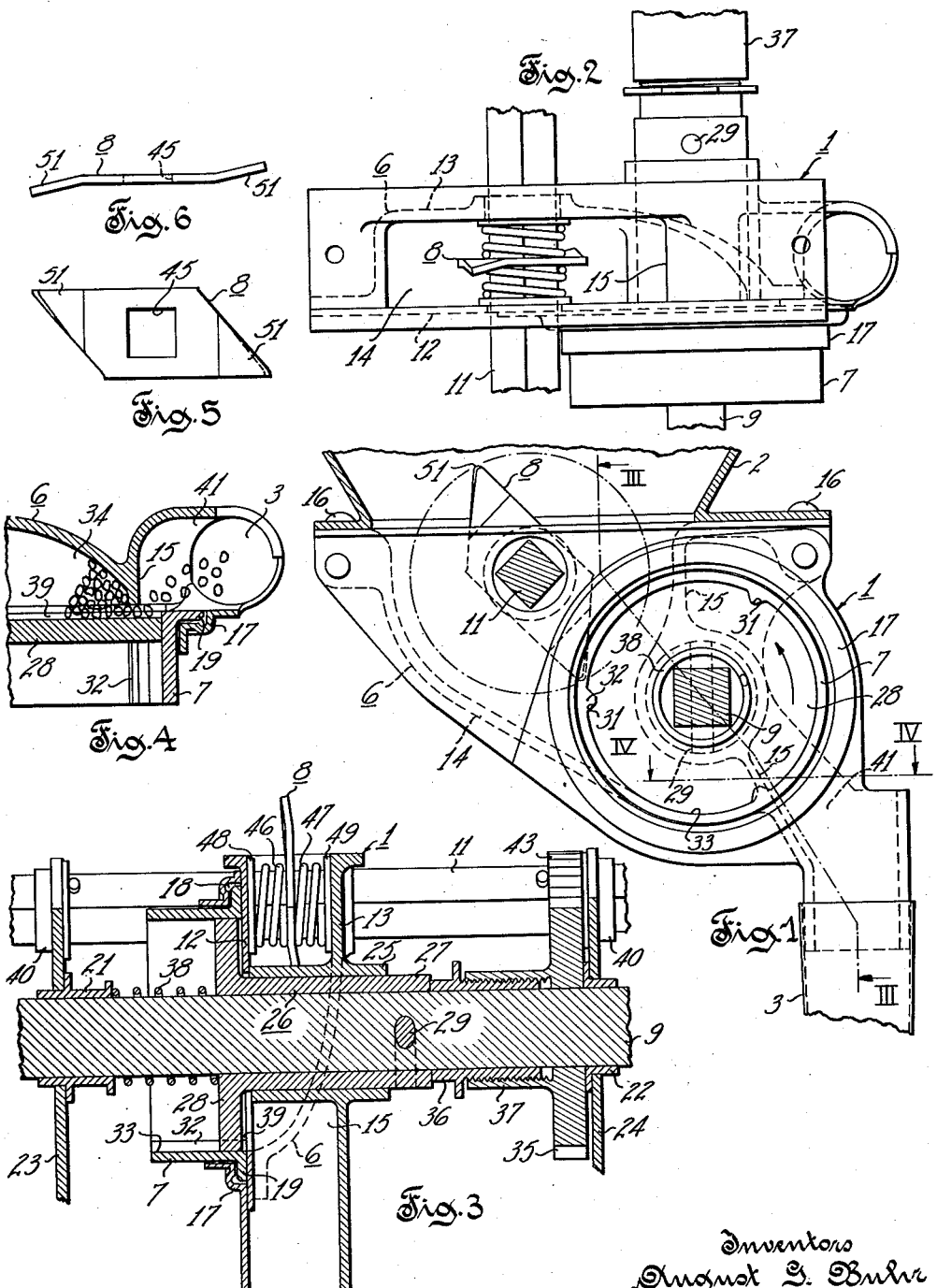

2,812,118

SEED AGITATING AND DISPENSING MECHANISM

August G. Buhr and Kenneth R. Weber, La Crosse, Wis., assignors to Allis-Chalmers Manufacturing Company, Milwaukee, Wis.

Application July 6, 1953, Serial No. 366,239

5 Claims. (Cl. 222—238)

This invention relates to seed planters having a seed dispensing device which meters seed from the hopper to tubes which convey the seed to the soil. More particularly the present invention is concerned with a seed dispensing device which includes a rotating cylindrical feed member having an internal peripheral portion for receiving and discharging seed, hereafter referred to as an internal rim feed seed dispensing device. Specifically, this invention is concerned with means for preventing clogging or bridging of the seed within the seed dispensing device and/or the associated seed confining hopper or cup structure.

Seed has a tendency to bridge or cling together within the hopper or seed dispensing device and prevents the free and uniform flow of seed from the hopper. This makes for uneven distribution of seed from grain drill hoppers so that in the planting operating the seed is either crowded together so that normal growth of the resulting plants is prevented or they are spaced apart distances such that full productivity is not attained. Bridging of seed within the hopper, therefore, hampers the uniform discharge of seed from the grain drill hopper which in turn decreases the productivity of any given area of land.

Devices have been provided to agitate the seed in order to prevent bridging within the hopper but all such agitating devices have a tendency to force the seed and cause cracking and breakage of the seed. This is particularly true in constructions having a rotating or oscillatory agitating element disposed in proximity to an internal portion of the seed confining structure. Furthermore, although bridging of seed may be prevented within the hopper, bridging frequently occurs in the passages in the seed dispensing device. In addition, straw, string and other foreign materials are frequently deposited in the hopper together with the seed. When such materials enter the seed dispensing device they tend to obstruct the passages in the device and to aid jamming or bridging of the seed. Although the seed may pass the obstruction, the foreign material usually remains which is conducive to periodic bridging, the latter continuing until the foreign material is removed by the operator.

To attain efficient planting, it is highly desirable to provide a seed dispensing device in which the seed is kept constantly agitated not only in the hopper but also in the dispensing device so that seed and foreign material such as string and straw will have a tendency to pass through the seed dispensing device without arching or bridging.

Accordingly, it is an object of this invention to provide a seed dispensing device incorporating parts combined for coaction in a novel manner effectively preventing the bridging of seed in the confining passages of a hopper or cup structure and/or the dispensing device associated therewith.

Another object of this invention is to provide a seed dispensing device embodying an agitator mounted in cooperative relation to portions of the seed dispensing device to agitate the seed without forcing or breaking the seed.

It is a further object of this invention to provide a seed dispensing device in which the seed is agitated within the internal portion of a rim feed member of the seed dispensing device.

It is still a further object of this invention to provide a seed dispensing device which agitates the seed within the device to afford free passage of seed and also foreign materials which may otherwise obstruct passage of the seed through the rim feed member of the seed dispensing device.

These and other objects and advantages of the invention will be apparent from the following description of a preferred embodiment of the invention shown in the drawings which accompany and form part of this specification and wherein:

Fig. 1 is a side view of a seed dispensing mechanism attached to a hopper with parts of the hopper broken away in the interest of simplicity;

Fig. 2 is a top view of the seed dispensing mechanism shown in Fig. 1;

Fig. 3 is a sectional view of the seed dispensing mechanism taken on line III—III in Fig. 1;

Fig. 4 is a sectional view of a portion of the seed dispensing mechanism taken on line IV—IV in Fig. 1;

Fig. 5 is a side view of the agitator element shown in Fig. 1; and

Fig. 6 is a top edge view of the agitator element shown in Fig. 5.

Referring to Fig. 1, the shown seed dispensing device 1 is generally known as a vertical or internal rim feed type and a plurality of such devices are ordinarily used in connection with grain drills for feeding seed at a predetermined rate from a hopper 2 to a tube 3 which conveys the seed to a furrow in the ground therebeneath. The feed device comprises a housing structure or seed cup 6 in which a drum or cylindrical feed rim element 7 and an agitator element 8 are mounted on feed shaft 9 and agitator shaft 11, respectively, for rotation therewith.

The housing member or seed cup 6 shown in Figs. 1 and 2 is of conventional construction and has a pair of spaced side walls 12 and 13 interconnected by a sloping rear wall and bottom 14 and a forward wall 15 all of which define a seed conveying passage. The seed cup 6 is adapted to be connected at the bottom of a hopper 2 of a grain drill by bolts 16 or the like.

As best shown in Fig. 3, the drum or cylindrical feed rim element 7 is rotatably mounted in the side wall 12 of the seed cup 6 by means of a ring 17 which is fastened to the side wall 12 to form a circular chamber or an annular space 18 rotatably receiving the annular radial flange 19 on the feed cup edge of the element 7.

The feed rim 7 is rotated by a mechanism which includes a feed shaft 9 which is square in cross section and provided with bushings 21 and 22 fixed thereon for rotation therewith. The bushings 21 and 22 are journaled for rotation in supporting brackets 23 and 24, respectively, which may be fastened to the grain drill hopper 2 to support the feed shaft.

Feed shaft 9 extends coaxially through feed rim 7 and through a coaxial hollow bearing 25 formed in the wall structure 15 uniting the side walls 12 and 13. Shaft 9 is driven in a conventional manner (not shown) as the particular means employed for imparting rotation thereto forms no part of the present invention.

Referring to Fig. 3, the driving connection between shaft 9 and the rim feeder 7 comprises an element 26 which is fixed on shaft 9 for movement therewith and includes a coaxial portion 27 journaled in the hollow bearing 25 for rotation and axial movement relative thereto and a radial disk portion 28 disposed within the feed rim 7. The periphery of disk portion 28 is provided with three circumferentially spaced axially extending notches 31 receiving complementary similarly spaced and extending ribs 32 formed on the internal surface 33 of the cylindrical feed rim 7. The coaction of the notches 31 and ribs 32 permits disk 28 to be moved axially relative to the feed rim by axially shifting the shaft 9. Such shifting varies the axial extent of the internal surface 33 of the feed rim 7 which is disposed in seed receiving relation to the seed conveying passage or seed confining space 34 between the walls 13, 14 and 15, as best seen in Figs. 3 and 4.

Axial movement of the feed shaft 9 in the bushings 21, 22 and the hollow bearing 25 may be effected in any conventional manner. In the preferred embodiment of the invention shown, such axial shifting is achieved by means of an externally threaded collar 36 coacting with an internally threaded hub portion 37 of a gear 35 which is fixed on feed shaft 9 adjacent bushing 22 for rotation therewith. By turning the collar 36 so that it moves axially out of the hub 37, the drive element 26 and therefore the feed shaft 9 are moved axially toward the left as viewed in Fig. 3 which further compresses a coil spring 38 surrounding the portion of feed shaft 9 between the bushing 21 and the drive disk portion 28 of element 26. This movement increases the gap 39 between the side wall 12 and the opposed surface of disk portion 28. Obviously, the seed discharge gap 39 can be readily decreased simply by turning the stop collar 36 into the hub 37, the spring 38 forcing the shaft 9 axially toward the right in Figure 3 and thereby drive disk portion 28 toward the side wall 12.

It should now be apparent that seed confined in the hopper 2 flows downward into the seed cup filling the space 34, the seed leaving the cup through the discharge opening 39 in the side wall 12 immediately to the left of the forward wall 15 as viewed in Figs. 1 and 4. The seed thus passes out of the cup and onto the internal surface 33 of the feed rim 7, which during operation rotates in a counterclockwise direction as viewed in Fig. 1. Consequently, the seed on the internal rim surface 33 is carried past the lower portion of the forward wall 15 and drops into the seed discharge channel 41 which conveys the seed thus discharged to the tube 3.

Referring again to Figs. 1 and 3, the agitator shaft 11 is rotatably mounted in suitable similar bearing structures 40 carried by the brackets 23 and 24. Rotation of agitator shaft 11 is effected by a gear 43 which is fixed thereon in meshed driven relation to the gear 35 on drive shaft 9.

Agitator shaft 11 has a square cross section and the agitator element 8 (note Fig. 5) is provided with a complementary shaft receiving opening 45 thus establishing a driving connection between the shaft 11 and the agitator element.

The agitator element 8 is normally maintained in a position intermediate the side walls 12 and 13 of the seed cup 6 by means of compression springs 46 and 47 which surround the shaft with their adjacent ends engaging opposite sides of the element 8 and with their remote ends engaging the washers 48 and 49, respectively, the latter surrounding the shaft in abutting relation to the inner surfaces of the walls 12 and 13, respectively. In addition to normally maintaining the agitator element 8 positioned midway the walls of the seed cup, the springs 46, 47 also function to hold the washers 48, 49 in firm engagement with the respective side walls 12 and 13. The washers have openings therethrough snugly receiving the shaft 11 and consequently effectively seal the aligned circular shaft receiving openings in the cup structure 6 thus preventing the leakage of seed therefrom. If during operation, seed or other material tends to become wedged between the agitator element and one of the walls 12, 13, the resilient mounting afforded by the springs 46, 47 permits the element to move axially of the shaft toward the other of said walls thus achieving a self-clearing action, and in addition prevents cracking and breaking of the seed.

As best seen in Figs. 3, 5 and 6, diagonally opposite ends of the agitator element are laterally oppositely offset to provide a pair of fingers 51, which upon rotation of the agitator element 8, travel in different paths. The use of laterally oppositely offset fingers coupled with the aforementioned axial movement of the agitator relative to the walls 12, 13 and the shaft 11 affords a substantially complete agitation of the seed confined in the cup 6 in the vicinity of the shaft 11.

In operation, the fingers 51 of the rotating agitator element 8 sweep through the seed confined in the space between the walls 12 and 13 and in part through seed confined in the space between wall 13 and the rotating feed elements; namely, rim 7 and the disk portion 28, as indicated by dot-dash lines in Fig. 1. In other words, the fingers overlap the rotating feed device and thus extend somewhat into the seed cavity formed in part by the feed rim 7 so that agitation of seed takes place within the seed cup 6 and also within the seed receiving cavity.

It should be particularly noted that the agitator element is mounted within the seed cup in close proximity to the rim feeder and that agitation of the seed takes place in the cup, in the feed rim element and in the hopper directly above the seed cup. This complete agitation prevents bridging of seed or the lodging of any foreign materials such as straw or string within the seed distributing mechanism. Furthermore, the agitator element 8 is mounted in a manner which permits a limited amount of flexibility between the shaft 9 and the agitator element so that seed will not lodge between the agitator element and the walls of the seed cup 6 or the feed rim 7 and be crushed or otherwise damaged.

Certain features of the invention are applicable to seed confining and/or dispensing mechanism other than the rim feed type employed in the preferred embodiment of the invention herein disclosed for purposes of illustration. Consequently, it should be understood that it is not intended to limit the invention to the particular form and details described hereinabove and that the invention includes such other forms and modifications as are embraced by the scope of the appended claims.

It is claimed and desired to secure by Letters Patent:

1. In a seed planter, the combination of an internal rim feed mechanism operative to dispense seed at a controlled rate of feed from a hopper, and an agitating mechanism at the inlet side of said internal rim feed mechanism operative to stir seed delivered thereto by gravity from said hopper; said rim feed mechanism comprising a cup structure secured to said hopper and having walls defining a seed conveying passage for receiving seed from a bottom opening in said hopper, a circular chamber on a horizontal axis in underlying relation to the bottom wall of said hopper, a seed conveying drum mounted within said chamber for rotation on said axis and presenting a seed receiving side that is open to said seed conveying passage; and said agitating mechanism comprising a rotary shaft member extending through said seed conveying passage in generally parallel, radially spaced relation to said axis of rotation of said seed drum, and an agitator element secured to said shaft member in radially extending relation thereto for rotation in unison therewith within said seed conveying passage, the radial extent of said agitator element being such that upon rotation of said shaft member the radially outer edge of said agitator element will sweep past said open side of said seed conveying drum.

2. In a seed planter, the combination of an internal rim feed mechanism operative to dispense seed at a controlled rate of feed from a hopper, and an agitating mechanism at the inlet side of said internal rim feed mechanism operative to stir seed delivered thereto by gravity from said hopper; said rim feed mechanism comprising a cup structure secured to said hopper and having walls defining a seed conveying passage for receiving seed from a bottom opening in said hopper, a circular chamber on a horizontal axis in underlying relation to the bottom wall of said hopper, a seed conveying drum mounted within said chamber for rotation on said axis and presenting a seed receiving side that is open to said seed conveying passage; and said agitating mechanism comprising a rotary shaft member extending through said seed conveying passage in generally parallel, radially spaced relation to said axis of rotation of said seed drum, and an agitator element secured to said shaft member in radially extending relation thereto for rotation in unison therewith within said seed conveying passage, the radial extent of said agitator element being such that upon rotation of said shaft member the radially outer edge of said agitator element will sweep past said open side of said seed conveying drum and into the lower portion of said hopper through said bottom opening of the latter.

3. In a seed planter, the combination set forth in claim 2, wherein a blade member forming said agitator element is mounted on said shaft in nonrotatable axially shiftable relation to the latter, and wherein resilient means surrounding said shaft member are operatively interposed between said agitator element and opposed wall portions of said seed conveying passage for resiliently retaining said agitator element in a predetermined position of axial adjustment relative to said shaft member.

4. A seed planter as set forth in claim 3 wherein said resilient means includes a pair of compression springs surrounding said shaft, one at each side of said blade member, and reacting against the latter and said opposed wall portions of said cup structure.

5. A seed planter as set forth in claim 3 in which said blade member presents a pair of fingers extending radially from said agitator shaft in opposite directions, one of said fingers having an outer end portion bent axially of said agitator shaft in one direction and the other of said fingers having an outer end portion bent axially of said agitator shaft in the opposite direction, said fingers traveling in paths in proximate relation to opposite wall portions of said cup structure.

References Cited in the file of this patent

UNITED STATES PATENTS

| 483,655 | Lang | Oct. 4, 1892 |
| 814,326 | Perry | Mar. 6, 1906 |
| 2,174,138 | Sage | Sept. 26, 1939 |
| 2,508,308 | Turak | May 16, 1950 |
| 2,616,592 | Boughman | Nov. 4, 1952 |